United States Patent
Yoshikawa

[11] Patent Number: 6,104,546
[45] Date of Patent: Aug. 15, 2000

[54] ATHERMALIZED FOCAL LENGTH EXTENDER FOR A ZOOM LENS HAVING A SPLIT REAR IMAGE-FORMING GROUP

[75] Inventor: Kazuo Yoshikawa, Saitama, Japan

[73] Assignee: Fuji Photo Optical Co., Ltd., Saitama, Japan

[21] Appl. No.: 09/199,060

[22] Filed: Nov. 24, 1998

[30] Foreign Application Priority Data

Nov. 25, 1997 [JP] Japan .................................. 9-339417

[51] Int. Cl.$^7$ .............................. G02B 15/02; G02B 7/02
[52] U.S. Cl. .......................... 359/674; 359/688; 359/820; 359/676
[58] Field of Search ................... 359/672–675, 359/820, 763–783, 680–690

[56] References Cited

U.S. PATENT DOCUMENTS

| | | | |
|---|---|---|---|
| 2,453,218 | 11/1948 | Grey | 350/481 |
| 4,632,520 | 12/1986 | Yamakawa | 350/446 |
| 5,745,298 | 4/1998 | Yahagi | 359/683 |

*Primary Examiner*—Georgia Epps
*Assistant Examiner*—David N. Spector
*Attorney, Agent, or Firm*—Young & Thompson

[57] ABSTRACT

An extender lens group removably incorporated in a zoom lens equipped with a temperature compensating feature for increasing the prim-lens focal length to achieve increased magnification is comprised of a front extender lens sub-group including four lens elements and a rear extender lens sub-group including two lens elements, the front extender lens sub-group including two positive bi-convex lens elements each of which has a strong curvature at the subject side surface followed by an overall positive doublet comprising a positive bi-convex lens element with a strong curvature at the subject side surface and a negative bi-concave lens element with a strong curvature at the image side surface and the rear extender lens sub-group including an overall positive doublet comprising a bi-concave lens element with a strong curvature at the image side surface and a positive meniscus lens element with a concave surface on the subject side. The extender lens group satisfying the following conditions:

$$P1 < 3.0$$
$$P2 > 12.0$$

where P1 is the temperature coefficient of refraction index of the negative lens element in the front extender lens sub-group and P2 is the temperature coefficient of refraction index of the positive lens element in the rear extender lens sub-group, the P1 and P2 being defined by dn/dt relative ($\times 10^{-6}$/°C.) for a wave length of e-line.

4 Claims, 7 Drawing Sheets

FIG. 6A
$v_1 \geq 80$
F/3.4

SPHERICAL ABERRATION(mm)

FIG. 6B
$v_1 < 80$
F/3.4

SPHERICAL ABERRATION(mm)

FIG. 7

ATHERMALIZED FOCAL LENGTH EXTENDER FOR A ZOOM LENS HAVING A SPLIT REAR IMAGE-FORMING GROUP

BACKGROUND OF THE INVENTION

1. Field of the Invention

This invention relates to a zoom lens suitable for a television camera and a video camera, and, more particularly, to a zoom lens equipped with a temperature compensating feature in which an extender lens group is removably incorporated to increase an effective focal length of the zoom lens.

2. Description of Related Art

There have been known a variety of zoom lenses for television cameras, video cameras and so forth which are designed and adapted to make a shift of focus as small as possible under various environmental conditions, in particular under a wide range of temperature conditions. In order to prevent aggravation of optical performance of such a zoom lens due to a shift of focus caused by a change in circumferential temperature, it has been known to make a selection of expansion coefficients for lens holding members and the like such that they are most suitable for causing deformation according to a change in circumferential temperature so as to shift lens elements in an axial direction opposite to a shift of focus due to the change in circumferential temperature and thereby to cancel the shift of focus of the zoom lens as one whole.

It is usual to change or increase the effective focal length of the zoom lens in order to achieve increased magnification, in particular, to produce an enlarged optical image of a subject at a long distance. As a simple way of increasing the effective focal length, it has been known to use an extender or tele converter lens group (which is hereafter referred to as an extender lens group) that increases the effective focal length of the zoom lens when incorporated in the zoom lens. The zoom lens is ordinarily adjusted to show the best optical performance under normal temperature conditions. In the case where the zoom lens is adapted to use an extender lens group in order increase its effective focal length, the zoom lens is adjusted such that the focal point is immovable under normal temperature conditions while the extender lens group is incorporated. However, when the circumferential temperature condition changes from normal temperatures, a component lens element changes its curvature of radius and index of refraction according to a coefficient of linear expansion and a change in the temperature coefficient of refractive index of the component lens element, respectively. Further, an axial distance between each adjacent component lens elements changes according to their coefficients of linear expansion. In consequence, the zoom lens causes a shift of focus between when the extender lens group is incorporated and when it is removed under circumferential temperature conditions other than normal temperatures.

Typically, the zoom lens has a front group of lens elements, namely a focusing lens group, which is movable along the optical axis to achieve focusing from infinity to moderately close distances. This focusing lens group functions to correct a shift of focus due to a change in temperature. However, when the zoom lens is focused on a subject while the extender lens group remains removed, it has to be readjusted to focus on the subject after incorporating the extender lens group. In the event where the zoom lens is focused on the side of the shortest zoom setting, i.e. on the wide angle side, since a shift of focus that is corrected by the focusing lens group is a little because of optical structure of the zoom lens, it is hard for the focusing lens group to correct an overall shift of focus caused by a change in temperature. Although the rearmost lens group is possibly used to focus the zoom lens, it is hard to correct a shift of focus due to incorporation of the extender lens group. In view of the above, in order for the zoom lens to show desired optical performance, it is essential that the zoom lens is designed such that the zoom lens with the extender lens group incorporated therein does not cause a shift of focus due to a change in circumferential temperature when it is focused on the wide angle side.

Figure 7:
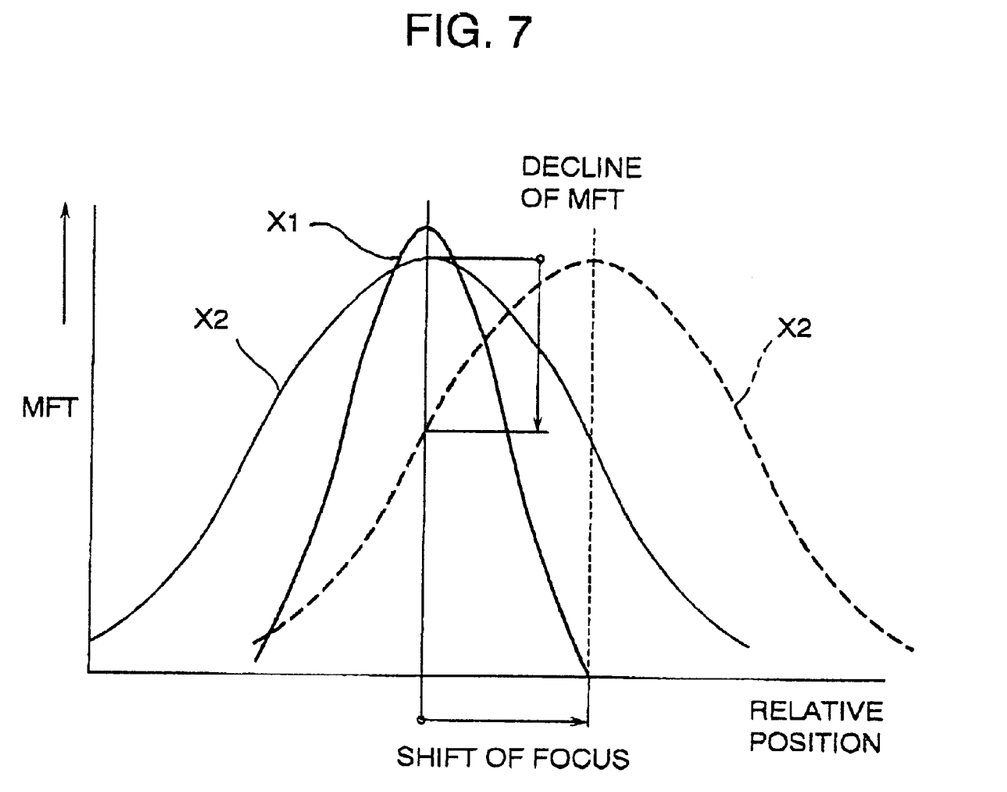
FIG. 7 is a graph showing a shift of focus of the zoom lens including an extender lens group due to a change in temperature.

For the purpose of providing a brief background that will enhance an understanding of the effect of a zoom lens of the present invention, reference is made to FIG. 7.

FIG. 7 shows a change of modulation transfer function (MTF) with respect to a shift of focus caused due to a change in temperature. As shown by solid lines (X1, X2), under normal temperature conditions, the zoom lens without the extender lens group has a focal point which coincides with a focal point of the zoom lens with the extender lens group. As shown by a chained line, while the zoom lens incorporates the extender lens group under temperature conditions other than normal temperature conditions, it causes a shift of focus from the focal point of the zoom lens without the extender lens group. In consequence, the zoom lens with the extender lens group experiences aggravation of modulation transfer function (MTF) as compared with the zoom lens without the extender lens group.

SUMMARY OF THE INVENTION

It is accordingly an object of the invention to provide a zoom lens equipped with a temperature compensating feature which prevents or significantly reduces a shift of focus due to a change in temperature between when the zoom lens optical system incorporates an extender lens group and when it does not incorporates the extender lens group.

It is another object of the invention to provide a zoom lens equipped with a temperature compensating feature which provides excellent optical performance by preventing or significantly reduces aggravation of chromatic aberrations of an extender lens group.

The foregoing objects of the invention are accomplished by providing a zoom lens equipped with a temperature compensating feature which comprises at least movable lens groups for focusing and zooming the zoom lens, a relay lens group disposed on the image side of the movable lens groups and comprising a front relay lens sub-group and a rear relay lens sub-group arranged at a predetermined axial separation for functioning to produce a focused image, and an extender lens group removably incorporated between the front and the rear relay lens sub-groups for increasing a prim-lens focal length of the zoom lens. The extender lens group comprises a front extender lens sub-group having positive refracting power and including at least a negative power lens element and a rear extender lens sub-group having positive refracting power and including at least a negative power lens element and is designed and adapted to satisfy the following conditions:

$P1 < 3.0$ $P2 > 12.0$ where P1 is the temperature coefficient of refraction index of the negative lens element in the front extender lens sub-group and P2 is the temperature coefficient of refraction index of the positive lens element in the rear extender lens sub-group and P1 and P2 are defined by dn/dt relative (×10⁻⁶/°C.) for a wave length of e-line.

The extender lens group is designed and adapted to further satisfy the following condition:

$$v1 \geq 80$$

where v1 is the dispersion of the positive lens element in the front extender lens sub-group.

The first and second parameters set forth are necessary for preventing or significantly reducing a shift of focus due to a change in temperature of the zoom lens with the extender lens group incorporated therein as small as possible.

The third parameter is necessary for ensuring desirably corrected spherical aberration and chromatic aberration.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

The term "prime lens" as used herein shall mean and refer to a lens system of the zoom lens in which an extender lens group is not incorporated in the zoom lens, and the term "extended lens" as used herein shall mean and refer to a lens system of the zoom lens in which the extender lens group is incorporated in the zoom lens. Further, the term "prime-lens focal length" as used herein shall mean and refer to the effective focal length of the prim lens.

Figure 1:
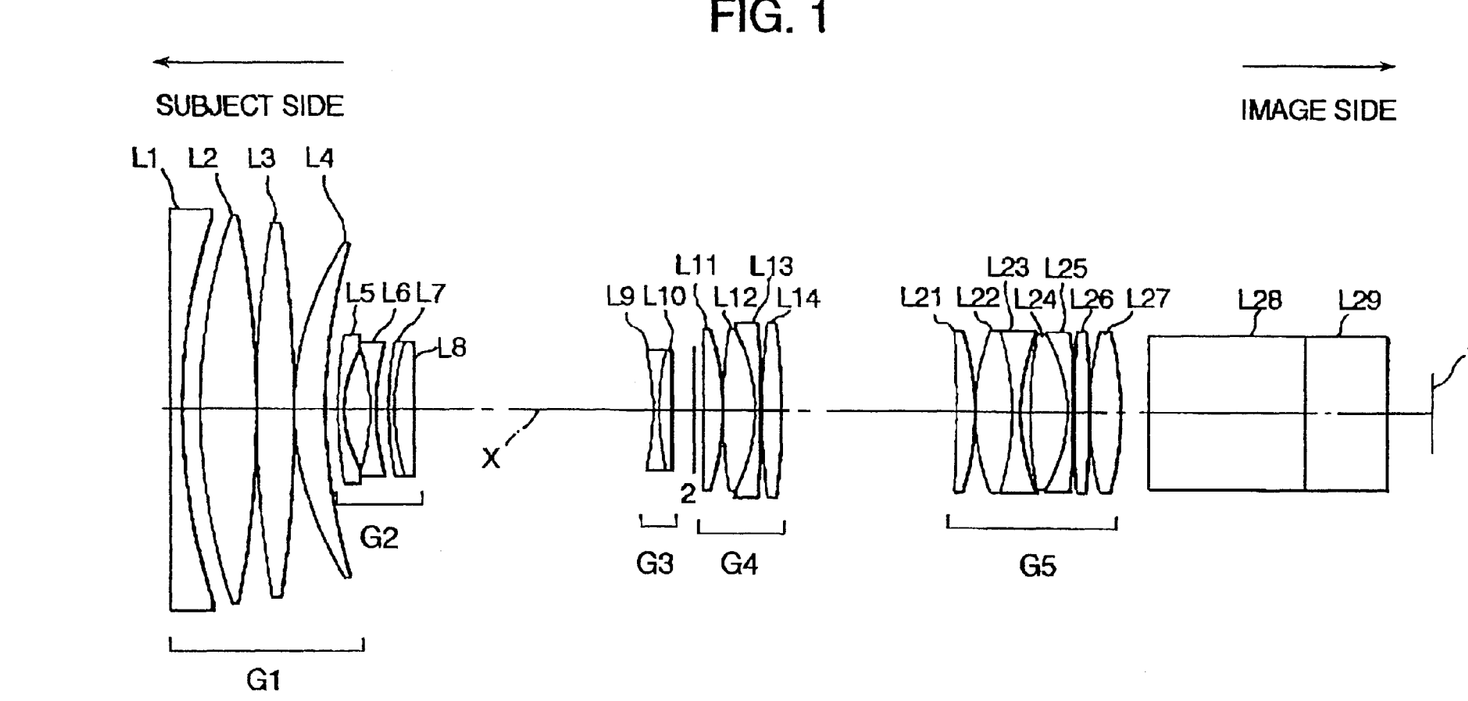
FIG. 1 is a schematic side view of a zoom lens equipped with a temperature compensating feature according to the invention in which an extender lens group is removed.
Figure 2:
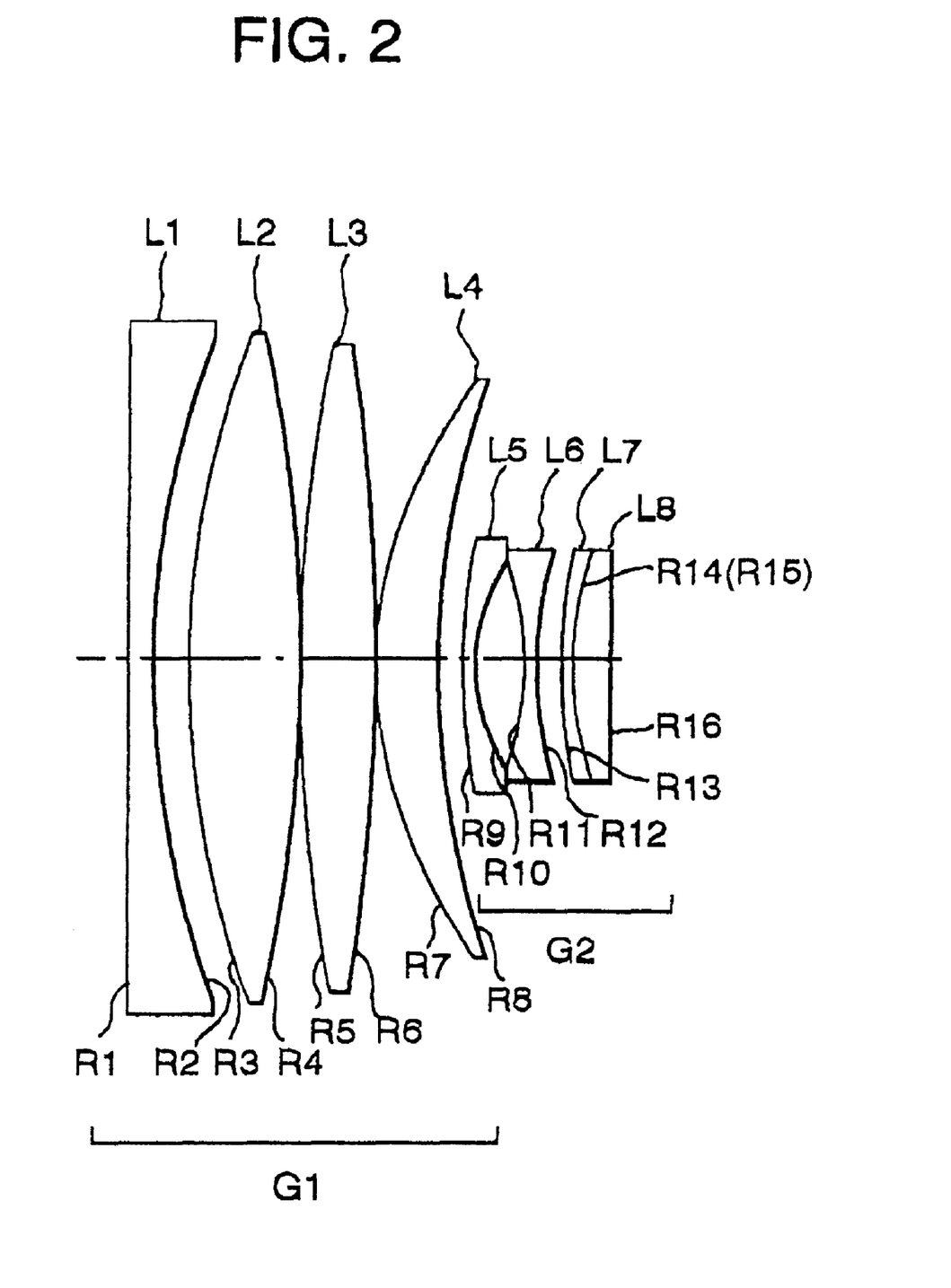
FIG. 2 is a schematic side view of a front part including first and second lens groups of the zoom lens of FIG. 1.
Figure 3:
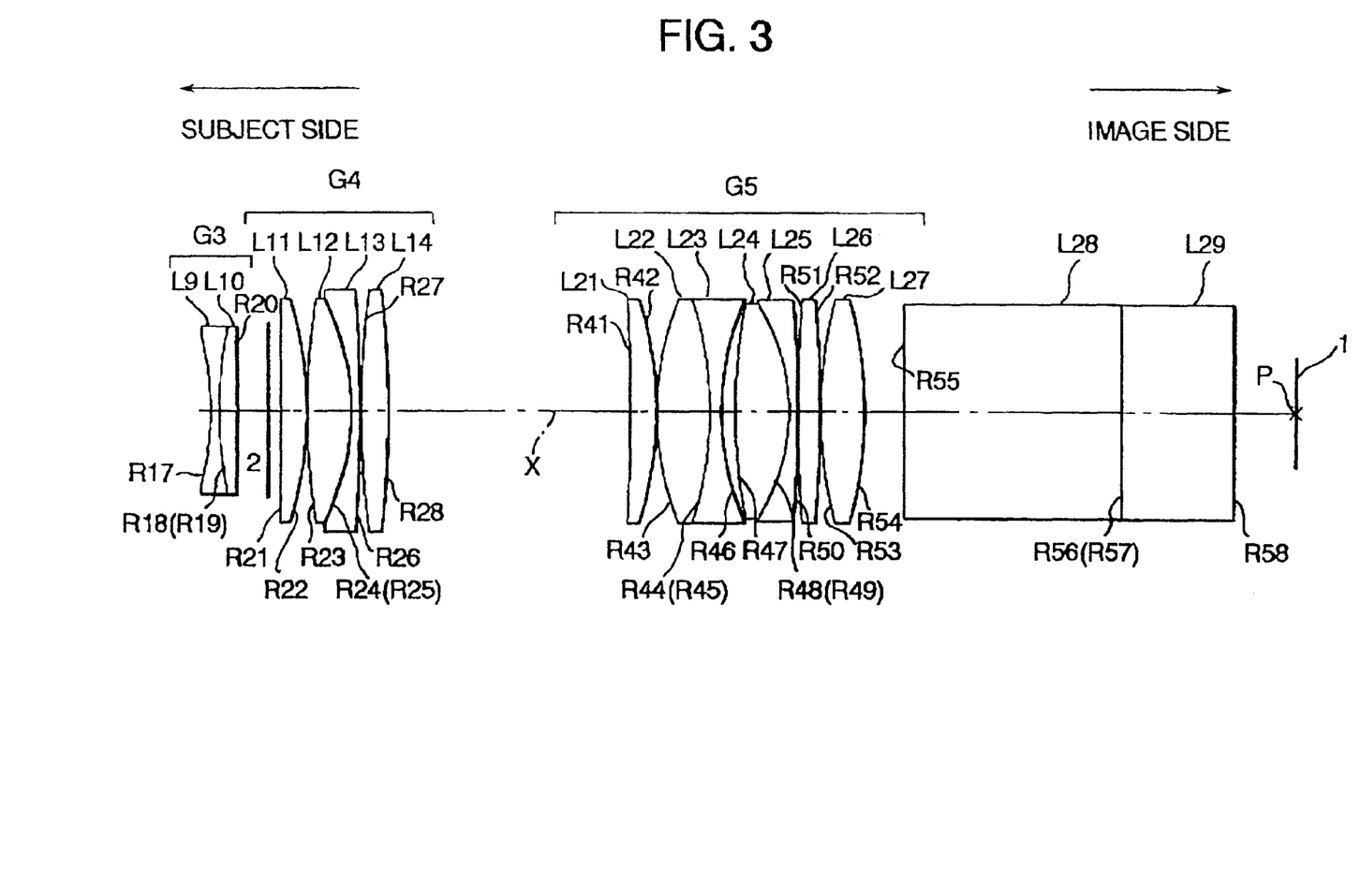
FIG. 3 is a schematic side view of a rear part including third to fifth lens groups of the zoom lens of FIG. 1.

Referring to the drawings in detail, in particular, to FIGS. 1 through 3 showing a prim lens of a zoom lens equipped with a temperature compensating feature embodying the invention as exemplified, from which an extender lens group is removed, the prim lens is comprised of, in order from the subject side, a positive power first lens group GI including four lens elements L1 to L4, a negative power second lens group GII including four lens elements L5 to L8, a negative power third lens group GIII including two lens elements L9 and L10, a positive power forth lens group GIV as a front relay lens group including four lens elements L11 to L14, and a positive power fifth lens group GV as a rear relay lens group including seven lens elements L21 to L26. Further, the prima lens includes a diaphragm shutter (DS) 2 between the third and fourth lens groups GIII and GIV. The zoom lens is attached to a television camera to form a color image on an image plane placed behind a color separation optical system including, for example, dichroic mirrors L28 and L29 and filters (not shown). The first lens group GI is movable axially for focusing the zoom lens. The second and third lens groups GII and GIII are movable axially relative to each other changing an axial distance therebetween to vary the overall focal length f during zooming.

Figure 4:
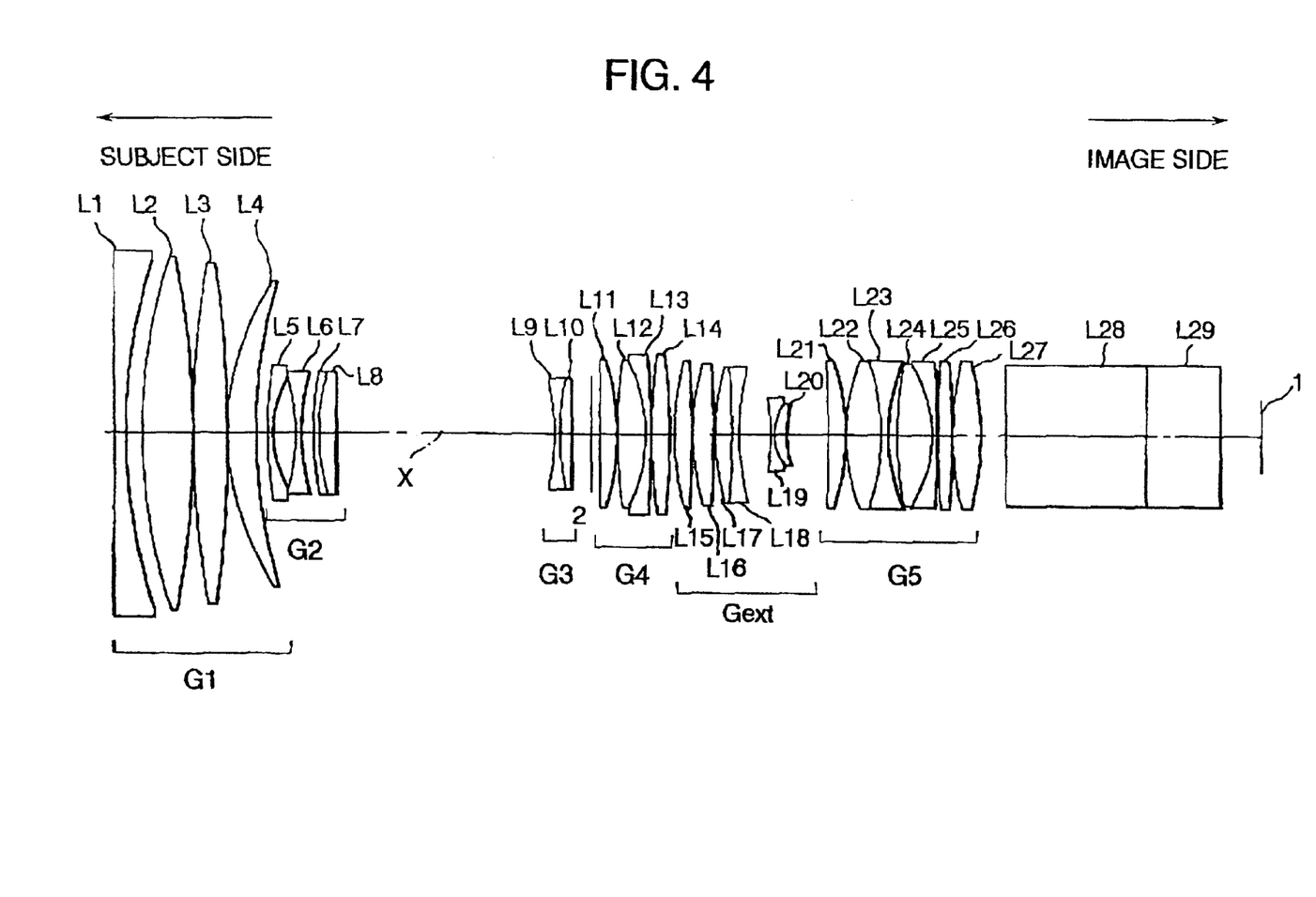
FIG. 4 is a schematic side view of the zoom lens equipped with a temperature compensating feature in which an extender lens group is incorporated.
Figure 5:
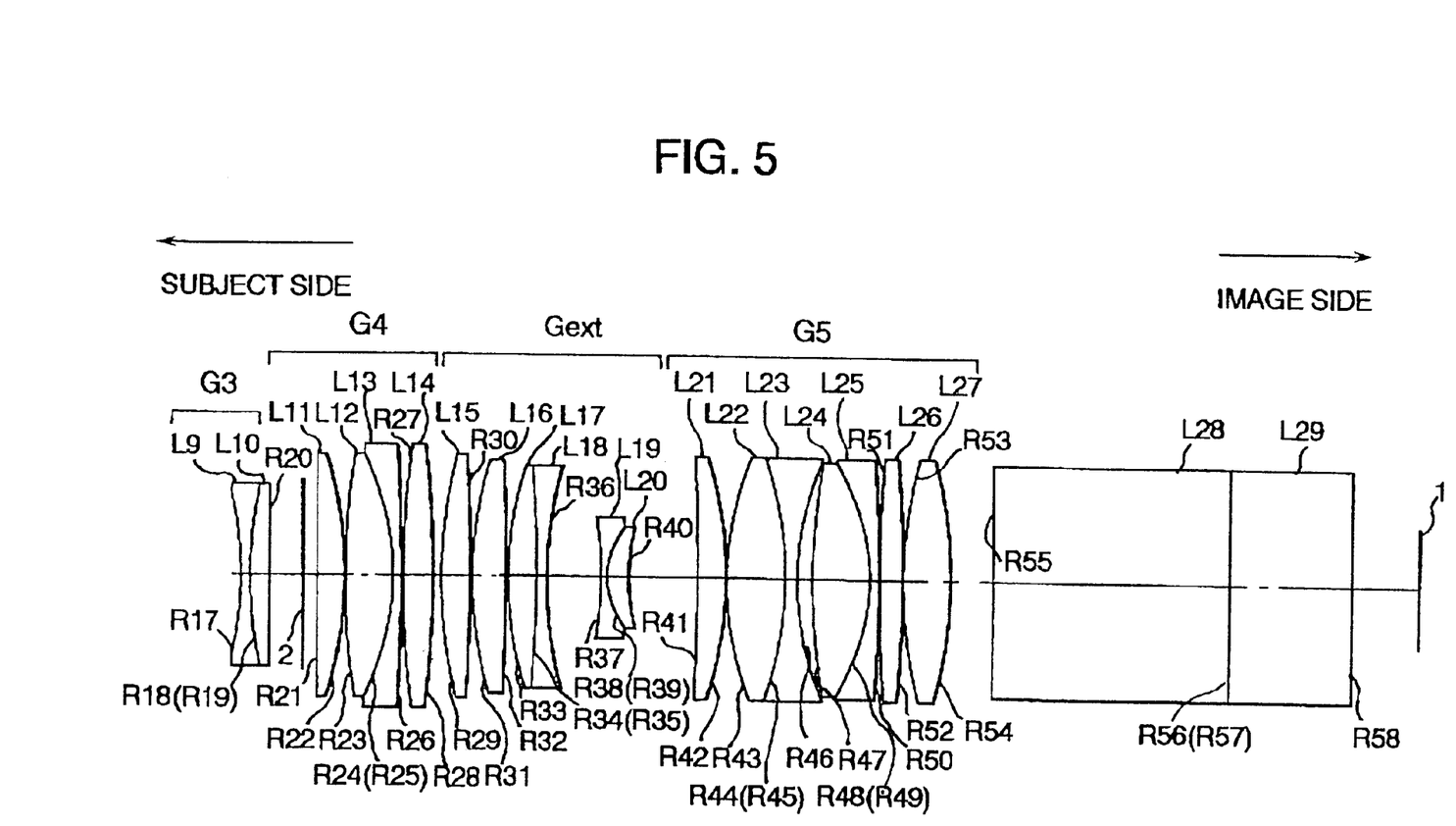
FIG. 5 is a schematic side view of a rear part including third to fifth lens groups of the zoom lens of FIG. 4.

FIGS. 4 and 5 show the zoom lens with an extender lens group Gext incorporated between the forth and fifth lens groups GIV and GV thereof (extended lens). In this embodiment, the extender lens group Gext is designed and adapted to increase the prim-lens focal length by X2. The extender lens group Gext is comprised of a front extender lens sub-group including four lens elements L15 to L18 and a rear extender lens sub-group including two lens elements L19 and L20. The extender lens group Gext is one of so called tele-extenders and increases the prime-lens focal length in order to achieve increased magnification. Specifically, as shown in FIG. 5, the front extender lens sub-group includes two positive bi-convex lens elements L15 and L16 each of which has a strong curvature at the subject side surface followed by an overall positive doublet comprising a positive bi-convex lens element L17 with a strong curvature at the subject side surface and a negative bi-concave lens element L18 with a strong curvature at the image side surface. The rear extender lens sub-group includes an overall positive doublet comprising a bi-concave lens element L19 with a strong curvature at the image side surface and a positive meniscus lens element L20 with a concave surface on the subject side.

The zoom lens in all embodiments of the invention must satisfy the following conditions:

$$P1 < 3.0 \quad (1)$$

$$P2 > 12.0 \quad (2)$$

where P1 designates the temperature coefficient of refraction index of a lens element having negative refracting power of the front extender lens sub-group, namely the negative bi-concave lens element L18, and P2 designates the temperature coefficient of refraction index of a lens element having positive refracting power of the rear extender lens sub-group, namely the positive meniscus lens element L20. P1 and P2 are defined by dn/dt relative (×10⁻⁶/°C.) for a wave length of e-line.

The zoom lens further satisfies the following condition:

$$v1 \geq 80 \quad (3)$$

where v1 designates the dispersion of a lens element having positive refraction power of the front extender lens sub-group, namely the lens element L15 and L16, as measured by the Abbe number. The zoom lens satisfying the conditions (1) and (2) prevents or significantly reduces a shift of focus of the extender lens group L15–L20 due to a change in temperature. A direction of a shift of focus from a reference focal point when the temperature rises is known from the following expression for calculating the overall focal length f of the zoom lens.

$$f = 1/\{(n-1)(1/r1 - 1/r2)\}$$

where r1 and r2 are lens surface radii of a lens element, and n is the refraction index of the lens element.

As apparent from the expression, when the temperature coefficient of refraction index has a plus value, i.e. when the refraction index changes to become large, a positive lens element causes a shift of focus in a minus direction from the reference focal point and a negative lens element causes a shift of focus in a plus direction from the reference focal point. Accordingly, when the temperature rises and the temperature coefficient has a plus value, the negative lens element L18 causes a shift of focus in the plus direction, and the positive lens element L20 causes a shift of focus in the minus direction. By employing a small temperature coefficient of refraction index for the negative lens element L18 and a large temperature coefficient of refraction index for the positive lens element L20, the overall zoom lens including the extender lens group Gext can be adjusted as one whole to cause a shift of focus controlled as close to 0 (zero) as possible. In consequence, it is achieved to significantly reduce a difference of a shift of focus due to a change in temperature between the prim lens (X1) and the extended lens (X2).

There are some glasses that have different temperature coefficients (dn/dt) even though they have the same refraction index and Abbe number. For example, as a glass specified by a refraction index ($N_d$) of 1.805 and an Abbe number ($v_d$) of 25.4, there are listed two glasses, one of which has a temperature coefficient (dn/dt) of 11.4 and another of which has a temperature coefficient (dn/dt) of 1.8. This results from whether the glass contains lead (Pb) and arsenic (As). By making the utilization of these same type glasses having different temperature coefficients for the lens element having negative refracting power of the front extender lens sub-group which is the negative bi-concave lens element L18 in this embodiment and the lens element having positive refracting power of the rear extender lens sub-group, which is the positive meniscus lens element L20 in this embodiment, a shift of focus caused due to a change in temperature in the zoom lens is prevented or significantly reduced. Glasses having the same refraction index and Abbe number but different temperature coefficients have only negligible influence on a shift of focus of the zoom lens because they have substantially same coefficients of linear expansion. Satisfaction of the third parameter ($v1 \geq 80$) ensures the extended lens which is free from significant chromatic aberrations.

In the following embodiments of the invention, the zoom lens and its lens elements are assembled into a zoom lens barrel by use of lens mounting rings. These lens barrel and lens mounting rings are made of aluminum whose coefficient of linear expansion is $230 \times 10^{-7}/°C$.

In the following tables, various embodiments of the invention are set forth with the parameters of the invention. In the following prescription tables, the reference L followed by an arabic numeral indicates the lens element progressively from the subject end to the image end of the zoom lens. The reference radius numbers R are the progressive lens surface rdii. Positive surface radii are struck from the right of the lens surface on the optica axis, and negative surface radii are struck from the left of the lens surface on the optica axis. $N_d$ is the index of refraction of the lens element. $v_d$ is the dispersion of the lens element as measured by the Abbe number. D followed by an arabic numeral indicates the axial distance between adjacent lens surfaces (the lens thickness of a lens element or the air space between adjacent lens elements).

A prim lens (X1) as shown in FIG. 1 is substantially described in Table I.

TABLE I

Overall Focal Length at Infinity: f = 9.32

| Element | Radius of Curvature (mm) | Axial Distance Between Surfaces (mm) | $N_e$ | $v_e$ |
|---|---|---|---|---|
| L1 | R1 = 4000.0 | 2.20 | 1.81263 | 25.3 |
|  | R2 = 101.01 | 4.31 |  |  |
| L2 | R3 = 112.99 | 10.63 | 1.43496 | 95.1 |
|  | R4 = −180.92 | 0.11 |  |  |
| L3 | R5 = 107.53 | 8.38 | 1.62032 | 63.0 |
|  | R6 = −399.42 | 0.11 |  |  |
| L4 | R7 = 57.70 | 6.12 | 1.73234 | 54.5 |
|  | R8 = 130.52 | 0.80 |  |  |
| L5 | R9 = 48.66 | 0.71 | 1.80399 | 42.0 |
|  | R10 = 16.45 | 5.95 |  |  |
| L6 | R11 = −27.93 | 0.71 | 1.77620 | 49.4 |
|  | R12 = 31.75 | 2.91 |  |  |
| L7 | R13 = 45.66 | 0.71 | 1.69401 | 54.5 |
|  | R14 = 22.56 | 0 |  |  |
| L8 | R15 = 22.56 | 3.65 | 1.85503 | 23.6 |
|  | R16 = 494.88 | 47.36 |  |  |
| L9 | R17 = −26.38 | 0.71 | 1.72692 | 51.0 |
|  | R18 = 36.65 | 2.60 |  |  |
| L10 | R19 = 36.65 | 5.04 | 1.81262 | 25.2 |
|  | R20 = 1818.20 |  |  |  |
| DS | R21 = −2704.47 | 1.51 |  |  |
| L11 | R22 = −38.74 | 3.90 | 1.58481 | 40.6 |
|  | R23 = 62.32 | 0.11 |  |  |
| L12 | R24 = −27.74 | 6.70 | 1.48914 | 70.2 |
|  | R25 = −27.74 | 0 |  |  |
| L13 | R26 = −155.83 | 1.10 | 1.80932 | 39.4 |
|  | R27 = 126.85 | 0.11 |  |  |
| L14 | R28 = −71.90 | 4.00 | 1.48914 | 70.2 |
|  | R41 = −1013.77 | 34.83 |  |  |
| L21 | R42 = −44.83 | 3.95 | 1.49394 | 81.7 |
|  | R43 = 34.67 | 0.11 |  |  |
| L22 | R44 = −39.71 | 7.25 | 1.55098 | 45.6 |
|  | R45 = −39.71 | 0 |  |  |
| L23 | R46 = 26.26 | 1.10 | 1.83961 | 42.8 |
|  | R47 = 37.69 | 2.00 |  |  |
| L24 | R48 = −26.67 | 7.49 | 1.51825 | 63.8 |
|  | R49 = −26.67 | 0 |  |  |

TABLE I-continued

Overall Focal Length at Infinity: f = 9.32

| Element | Radius of Curvature (mm) | Axial Distance Between Surfaces (mm) | $N_e$ | $\upsilon_e$ |
|---|---|---|---|---|
| L25 | | 1.05 | 1.81080 | 40.5 |
| | R50 = 520.28 | | | |
| | | 0.11 | | |
| | R51 = 94.77 | | | |
| L26 | | 3.23 | 1.51825 | 63.8 |
| | R52 = −177.63 | | | |
| | | 0.11 | | |
| | R53 = 45.59 | | | |
| L27 | | 6.22 | 1.51825 | 63.8 |
| | R54 = −44.27 | | | |
| | | 5.00 | | |
| | R55 = ∞ | | | |
| L28 | | 30.00 | 1.60718 | 37.8 |
| | R56 = ∞ | | | |
| | | 0 | | |
| | R57 = ∞ | | | |
| L29 | | 16.20 | 1.51825 | 63.8 |
| | R58 = ∞ | | | |

An extended lens (X2) as shown in FIG. 4 is substantially described in Table II.

TABLE II

Overall Focal Length at Infinity: f = 18.08

| Element | Radius of Curvature (mm) | Axial Distance Between Surfaces (mm) | $N_e$ | $\upsilon_e$ |
|---|---|---|---|---|
| L1 | R1 = 4000.0 | | | |
| | | 2.20 | 1.81263 | 25.3 |
| | R2 = 101.01 | | | |
| | | 4.31 | | |
| L2 | R3 = 112.99 | | | |
| | | 10.63 | 1.43496 | 95.1 |
| | R4 = −180.92 | | | |
| | | 0.11 | | |
| L3 | R5 = 107.53 | | | |
| | | 8.38 | 1.62032 | 63.0 |
| | R6 = −399.42 | | | |
| | | 0.11 | | |
| L4 | R7 = 57.70 | | | |
| | | 6.12 | 1.73234 | 54.5 |
| | R8 = 130.52 | | | |
| | | 0.80 | | |
| L5 | R9 = 48.66 | | | |
| | | 0.71 | 1.80399 | 42.0 |
| | R10 = 16.45 | | | |
| | | 5.95 | | |
| L6 | R11 = −27.93 | | | |
| | | 0.71 | 1.77620 | 49.4 |
| | R12 = 31.75 | | | |
| | | 2.91 | | |
| L7 | R13 = 45.66 | | | |
| | | 0.71 | 1.69401 | 54.5 |
| | R14 = 22.56 | | | |
| | | 0 | | |
| L8 | R15 = 22.56 | | | |
| | | 3.65 | 1.85503 | 23.6 |
| | R16 = 494.88 | | | |
| | | 47.36 | | |
| L9 | R17 = −26.38 | | | |
| | | 0.71 | 1.72692 | 51.0 |
| | R18 = 36.65 | | | |
| | | 2.60 | | |
| L10 | R19 = 36.65 | | | |
| | | 5.04 | 1.81262 | 25.2 |
| | R20 = 1818.20 | | | |
| DS | | 1.51 | | |
| | R21 = −2704.47 | | | |

TABLE II-continued

Overall Focal Length at Infinity: f = 18.08

| Element | Radius of Curvature (mm) | Axial Distance Between Surfaces (mm) | $N_e$ | $\upsilon_e$ |
|---|---|---|---|---|
| L11 | | 3.90 | 1.58481 | 40.6 |
| | R22 = −38.74 | | | |
| | | 0.11 | | |
| | R23 = 62.32 | | | |
| L12 | | 6.70 | 1.48914 | 70.2 |
| | R24 = −27.74 | | | |
| | | 0 | | |
| | R25 = −27.74 | | | |
| L13 | | 1.10 | 1.80932 | 39.4 |
| | R26 = −155.83 | | | |
| | | 0.11 | | |
| | R27 = 126.85 | | | |
| L14 | | 4.00 | 1.48914 | 70.2 |
| | R28 = −71.90 | | | |
| | | 1.00 | | |
| | R29 = 58.76 | | | |
| L15 | | 3.50 | 1.49845 | 81.2 |
| | R30 = −299.73 | | | |
| | | 0.11 | | |
| | R31 = 38.38 | | | |
| L16 | | 4.95 | 1.49845 | 81.2 |
| | R32 = −151.11 | | | |
| | | 0.11 | | |
| | R33 = 45.76 | | | |
| L17 | | 4.19 | 1.62554 | 57.9 |
| | R34 = −66.05 | | | |
| | | 0 | | |
| | R35 = −66.05 | | | |
| L18 | | 0.99 | 1.81264 | 25.2 |
| | R36 = 59.62 | | | |
| | | 9.09 | | |
| | R37 = −61.57 | | | |
| L19 | | 0.85 | 1.73233 | 54.4 |
| | R38 = 12.03 | | | |
| | | 0 | | |
| | R39 = 12.03 | | | |
| L20 | | 2.38 | 1.85501 | 23.7 |
| | R40 = 18.26 | | | |
| | | 7.72 | | |
| | R41 = −1013.77 | | | |
| L21 | | 3.95 | 1.49394 | 81.7 |
| | R42 = −44.83 | | | |
| | | 0.11 | | |
| | R43 = 34.67 | | | |
| L22 | | 7.25 | 1.55098 | 45.6 |
| | R44 = −39.71 | | | |
| | | 0 | | |
| | R45 = −39.71 | | | |
| L23 | | 1.10 | 1.83961 | 42.8 |
| | R46 = 26.26 | | | |
| | | 2.00 | | |
| | R47 = 37.69 | | | |
| L24 | | 7.49 | 1.51825 | 63.8 |
| | R48 = −26.67 | | | |
| | | 0 | | |
| | R49 = −26.67 | | | |
| L25 | | 1.05 | 1.81080 | 40.5 |
| | R50 = 520.28 | | | |
| | | 0.11 | | |
| | R51 = 94.77 | | | |
| L26 | | 3.23 | 1.51825 | 63.8 |
| | R52 = −177.63 | | | |
| | | 0.11 | | |
| | R53 = 45.59 | | | |
| L27 | | 6.22 | 1.51825 | 63.8 |
| | R54 = −44.27 | | | |
| | | 5.00 | | |
| | R55 = ∞ | | | |
| L28 | | 30.00 | 1.60718 | 37.8 |
| | R56 = ∞ | | | |
| | | 0 | | |

TABLE II-continued

Overall Focal Length at Infinity: f = 18.08

| Element | Radius of Curvature (mm) | Axial Distance Between Surfaces (mm) | $N_e$ | $\nu_e$ |
|---|---|---|---|---|
| L29 | R57 = ∞ | 16.20 | 1.51825 | 63.8 |
|  | R58 = ∞ |  |  |  |

Temperature coefficients of refraction index and coefficients of linear expansion of the lens elements of the zoom lens as shown in FIG. 1 are substantially described in Table III.

TABLE III

| Element | Temperature Coefficient of Refraction Index (dn/dt relative) ($\times 10^{-6}/°$ C.) | Coefficient of Linear Expansion ($\times 10^{-7}/°$ C.) |
|---|---|---|
| L1 | 1.8 | 89 |
| L2 | −10.2 | 181 |
| L3 | −3.5 | 101 |
| L4 | 4.3 | 59 |
| L5 | 6.9 | 60 |
| L6 | 4.7 | 62 |
| L7 | 4.2 | 62 |
| L8 | 13.6 | 78 |
| L9 | 6.2 | 55 |
| L10 | 11.4 | 81 |
| L11 | 3.4 | 87 |
| L12 | −0.6 | 90 |
| L13 | 7.6 | 58 |
| L14 | −0.6 | 90 |
| L15 | −6.2 | 133 |
| L16 | −6.2 | 133 |
| L17 | 2.4 | 70 |
| L18 | 1.8 | 89 |
| L19 | 4.3 | 59 |
| L20 | 13.6 | 78 |
| L21 | −6.2 | 133 |
| L22 | 2.9 | 84 |
| L23 | 5.2 | 62 |
| L24 | 2.8 | 72 |
| L25 | 7.3 | 59 |
| L26 | 2.8 | 72 |
| L27 | 2.8 | 72 |
| L28 | 3.6 | 88 |
| L29 | 2.8 | 72 |

A shift of focus due to a change in temperature of the zoom lens at the shortest zoom setting is indicated in Table IV. In the Table IV, Δ1 indicates a shift of focus of the prime zoom lens measured at the shortest zoom setting, and Δ2 indicates a shift of focus of the extended lens measured at the shortest zoom setting.

TABLE IV

| Temperature Coefficient of Lens Element L18 (dn/dt relative) | Temperature Coefficient of Lens Element L20 (dn/dt relative) | Shift of Focus Δ1 of Prim Lens System at Shortest Zoom Setting | Shift of Focus Δ2 of Extended Lens System at Shortest Zoom Setting |
|---|---|---|---|
| $1.8 \times 10^{-6}/°$ C. | $13.6 \times 10^{-6}/°$ C. | 0.3 μm/° C. | 2.9 μm/° C. |

As set forth in Table III, the negative lens element L18 of the extender lens group Gext has a temperature coefficient of refraction index of $1.8 \times 10^{-6}/°$C. and the positive lens element L20 of the extender lens group Gext has a temperature coefficients of refraction index of $13.6 \times 10^{-6}/°$C. In consequence, as indicated in Table IV, while the prim lens causes a shift of focus (Δ1) of 0.3 μm/°C. at the shortest zoom setting, the extended zoom lens increasing the prim-lens focal length by X2 causes a shift of focus (Δ2) of 2.9 μm/°C. at the shortest zoom setting. It is apparent that the difference of a shift of focus is notably small between the prom lens and the extended lens.

A zoom lens in accordance with another embodiment of the invention comprises the prim lens shown in FIG. 1 and an extender lens group Gext substantially described in Table V.

TABLE V

Overall Focal Length at Infinity: f = 18.08

| Element | Radius of Curvature (mm) | Axial Distance Between Surfaces (mm) | $N_e$ | $\nu_3$ |
|---|---|---|---|---|
|  |  | 1.00 |  |  |
| L15 | R29 = 58.76 | 3.50 | 1.49845 | 81.2 |
|  | R30 = −299.73 | 0.11 |  |  |
| L16 | R31 = 38.38 | 4.95 | 1.49845 | 81.2 |
|  | R32 = −151.11 | 0.11 |  |  |
| L17 | R33 = 45.76 | 4.19 | 1.62554 | 57.9 |
|  | R34 = −66.05 | 0 |  |  |
| L18 | R35 = −66.05 | 0.93 | 1.81264 | 25.2 |
|  | R36 = 59.62 | 9.09 |  |  |
| L19 | R37 = −61.57 | 0.85 | 1.73233 | 54.4 |
|  | R38 = 12.03 | 0 |  |  |
| L20 | R39 = 12.03 | 2.38 | 1.85501 | 23.7 |
|  | R40 = 18.26 | 7.72 |  |  |

Temperature coefficients of refraction index and coefficients of linear expansion of the lens elements of the zoom lens according to the second embodiment are substantially described in Table VI.

TABLE VI

| Element | Temperature Coefficient of Refraction Index (dn/dt relative) ($\times 10^{-6}/°$ C.) | Coefficient of Linear Expansion ($\times 10^{-7}/°$ C.) |
|---|---|---|
| L15 | −6.2 | 133 |
| L16 | −6.2 | 133 |
| L17 | 2.4 | 70 |
| L18 | 11.4 | 81 |
| L19 | 4.3 | 59 |
| L20 | 13.6 | 78 |

A shift of focus due to a change in temperature of the zoom lens at the shortest zoom setting is indicated in Table VII. In the Table VII, Δ1 indicates a shift of focus of the prime lens measured at the shortest zoom setting, and Δ2 indicates a shift of focus of the extended lens measured at the shortest zoom setting.

TABLE VII

| Temperature Coefficient of Lens Element L18 (dn/dt relative) | Temperature Coefficient of Lens Element L20 (dn/dt relative) | Shift of Focus Δ1 of Prim Lens System at Shortest Zoom Setting | Shift of Focus Δ2 of Extended Lens System at Shortest Zoom Setting |
|---|---|---|---|
| $11.4 \times 10^{-6}/°C$ | $13.6 \times 10^{-6}/°C$ | $0.3 \mu m/°C$ | $4.7 \mu m/°C$ |

As set forth in Table VI, the negative lens element L18 of the extender lens group Gext has a temperature coefficient of refraction index of $11.4 \times 10^{-6}/°C$. and the positive lens element L20 of the extender lens group Gext has a temperature coefficients of refraction index of $13.6 \times 10^{-6}/°C$. In consequence, as indicated in Table VII, while the prim lens causes a shift of focus (Δ1) of 0.3 μm/°C. at the shortest zoom setting, the extended zoom lens increasing the prim-lens focal length by X2 causes a shift of focus (Δ2) of 4.7 μm/°C. at the shortest zoom setting. It is apparent that although the difference of a shift of focus is greater than that of the zoom lens of the first embodiment, it is still relatively small between the prom lens and the extended lens.

A zoom lens in accordance with still another embodiment of the invention comprises the prim lens shown in FIG. 1 and an extender lens group Gext substantially described in Table VIII.

TABLE VIII

Overall Focal Length at Infinity: f = 18.08

| Element | Radius of Curvature (mm) | Axial Distance Between Surfaces (mm) | $N_e$ | $v_e$ |
|---|---|---|---|---|
|  |  | 1.00 |  |  |
|  | R29 = 58.76 |  |  |  |
| L15 |  | 3.50 | 1.49845 | 81.2 |
|  | R30 = −299.73 |  |  |  |
|  |  | 0.11 |  |  |
|  | R31 = 38.38 |  |  |  |
| L16 |  | 4.95 | 1.49845 | 81.2 |
|  | R32 = −151.11 |  |  |  |
|  |  | 0.11 |  |  |
|  | R33 = 45.76 |  |  |  |
| L17 |  | 4.19 | 1.62554 | 57.9 |
|  | R34 = −66.05 |  |  |  |
|  |  | 0 |  |  |
|  | R35 = −66.05 |  |  |  |
| L18 |  | 0.93 | 1.81264 | 25.2 |
|  | R36 = 59.62 |  |  |  |
|  |  | 9.09 |  |  |
|  | R37 = −61.57 |  |  |  |
| L19 |  | 0.85 | 1.73233 | 54.4 |
|  | R38 = 12.03 |  |  |  |
|  |  | 0 |  |  |
|  | R39 = 12.03 |  |  |  |
| L20 |  | 2.38 | 1.85504 | 23.6 |
|  | R40 = 18.26 |  |  |  |
|  |  | 7.72 |  |  |

Temperature coefficients of refraction index and coefficients of linear expansion of the lens elements of the zoom lens according to the third embodiment are substantially described in Table IX.

TABLE IX

| Element | Temperature Coefficient of Refraction Index (dn/dt relative) $(\times 10^{-6}/°C.)$ | Coefficient of Linear Expansion $(\times 10^{-7}/°C.)$ |
|---|---|---|
| L15 | −6.2 | 133 |
| L16 | −6.2 | 133 |
| L17 | 2.4 | 70 |
| L18 | 11.4 | 81 |
| L19 | 4.3 | 59 |
| L20 | 1.9 | 91 |

A shift of focus due to a change in temperature of the zoom lens at the shortest zoom setting is indicated in Table X. In the Table X, Δ1 indicates a shift of focus of the prime lens measured at the shortest zoom setting, and Δ2 indicates a shift of focus of the extended lens measured at the shortest zoom setting.

TABLE X

| Temperature Coefficient of Lens Element L18 (dn/dt relative) | Temperature Coefficient of Lens Element L20 (dn/dt relative) | Shift of Focus Δ1 of Prim Lens System at Shortest Zoom Setting | Shift of Focus Δ2 of Extended Lens System at Shortest Zoom Setting |
|---|---|---|---|
| $11.4 \times 10^{-6}/°C$ | $1.9 \times 10^{-6}/°C$ | $0.3 \mu m/°C$ | $5.6 \mu m/°C$ |

As set forth in Table IX, the negative lens element L18 of the extender lens group Gext has a temperature coefficient of refraction index of $1.9 \times 10^{-6}/°C$. and the positive lens element L20 of the extender lens group Gext has a temperature coefficients of refraction index of $13.6 \times 10^{-6}/°C$. In consequence, as indicated in Table VII, while the prim lens causes a shift of focus (Δ1) of 0.3 μm/°C. at the shortest zoom setting, the extended zoom lens increasing the prim-lens focal length by X2 causes a shift of focus (Δ2) of 5.6 μm/°C. at the shortest zoom setting. It is apparent that although the difference of a shift of focus is greater than that of the zoom lens of the first embodiment, it is still relatively small between the prom lens and the extended lens.

A zoom lens in accordance with a further embodiment of the invention comprises the prim lens shown in FIG. 1 and an extender lens group Gext substantially described in Table XI.

TABLE XI

Overall Focal Length at Infinity: f = 18.08

| Element | Radius of Curvature (mm) | Axial Distance Between Surfaces (mm) | $N_e$ | $v_e$ |
|---|---|---|---|---|
|  |  | 1.00 |  |  |
|  | R29 = 58.34 |  |  |  |
| L15 |  | 3.50 | 1.48914 | 70.2 |
|  | R30 = −299.68 |  |  |  |
|  |  | 0.11 |  |  |
|  | R31 = 37.84 |  |  |  |
| L16 |  | 4.95 | 1.48914 | 70.2 |
|  | R32 = −133.52 |  |  |  |
|  |  | 0.11 |  |  |
|  | R33 = 41.82 |  |  |  |
| L17 |  | 4.19 | 1.62554 | 57.9 |
|  | R34 = −61.22 |  |  |  |
|  |  | 0 |  |  |
|  | R35 = −61.22 |  |  |  |
| L18 |  | 0.93 | 1.81264 | 25.2 |

TABLE XI-continued

Overall Focal Length at Infinity: f = 18.08

| Element | Radius of Curvature (mm) | Axial Distance Between Surfaces (mm) | $N_e$ | $\upsilon_e$ |
|---|---|---|---|---|
| | R36 = 52.12 | | | |
| | | 9.09 | | |
| | R37 = -64.72 | | | |
| L19 | | 0.85 | 1.73233 | 54.4 |
| | R38 = 12.15 | | | |
| | | 0 | | |
| | R39 = 12.15 | | | |
| L20 | | 2.38 | 1.85501 | 23.7 |
| | R40 = 18.31 | | | |
| | | 7.72 | | |

Table XII show the Abbe numbers of the lens elements L18 and L20 of the extender lens group Gext of each embodiment.

TABLE XII

| | 1ST EMBODIMENT | 2ND EMBODIMENT | 3RD EMBODIMENT | 4TH EMBODIMENT |
|---|---|---|---|---|
| Lens Element L15 | 81.2 | 81.2 | 81.2 | 70.2 |
| Lens Element L16 | 81.2 | 81.2 | 81.2 | 70.2 |

Figure 6A:
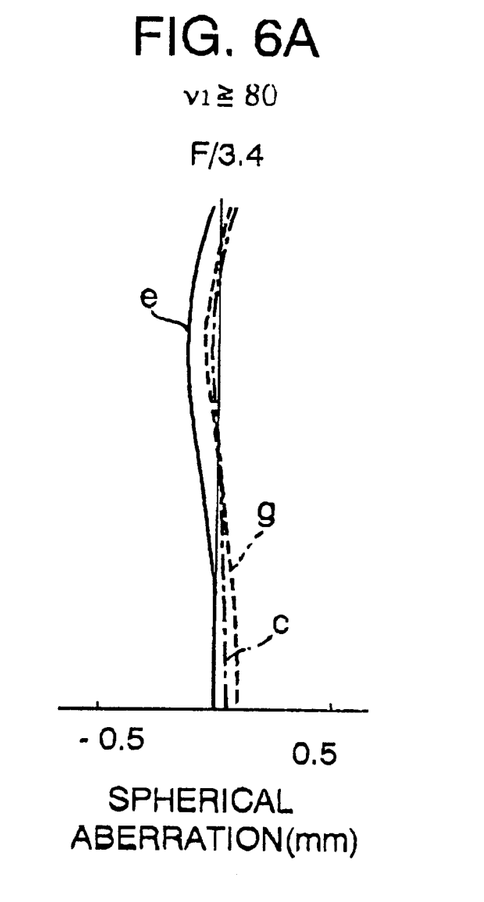
FIG. 6A is a graph showing spherical aberrations of a zoom lens equipped with a temperature compensating feature according to an embodiment of the invention.
Figure 6B:
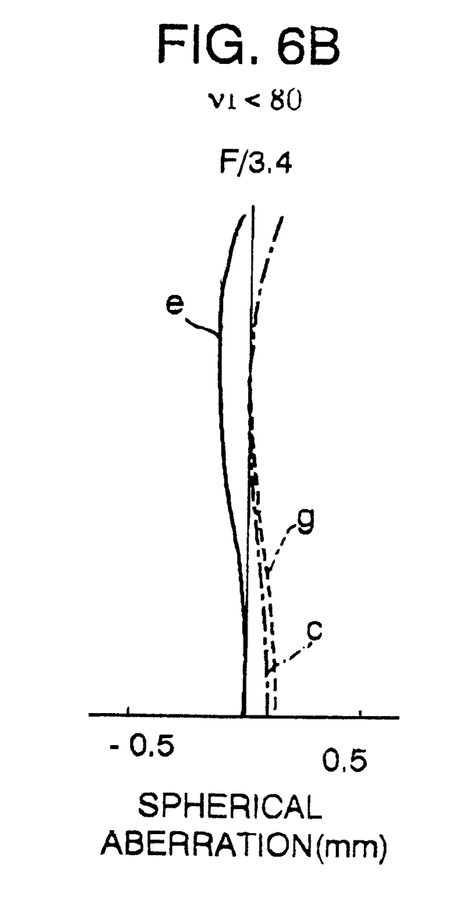
FIG. 6B is a graph showing spherical aberrations of a zoom lens equipped with a temperature compensating feature according to another embodiment of the invention.

As apparent in Table In this instance, the lens elements L15 and L16, each comprising a single lens element having a positive refraction power, have the Abbe number of 70.2 and do not satisfy the condition (3), which provides no effect of preventing or reducing an occurrence of chromatic aberrations in the extender lens group Gext. However, the lens elements L15 and L16 of the first to the third embodiments satisfy the condition (3), which prevents or significantly reduce an occurrence of chromatic aberrations in the extender lens group Gext, so that there is only a small change in chromatic aberration between the prim lens and the extended lens. As shown in FIG. 6, the zoom lens according to the first embodiment causes spherical aberraions relating to wave lengths of c-, e- and g-lines noticably less than the zoom lens according to the fourth embodiment. From FIG. 6, it is proved that the condition (3) is of a great importance in order to prevent or significantly reduce aggravation of, in particular, spherical aberration.

Temperature coefficients of refraction index and coefficients of linear expansion of the lens elements of the zoom lens according to the fourth embodiment are substantially described in Table XIII.

TABLE XIII

| Element | Temperature Coefficient of Refraction Index (dn/dt relative) ($\times 10^{-6}/°$ C.) | Coefficient of Linear Expansion ($\times 10^{-7}/°$ C.) |
|---|---|---|
| L15 | -0.6 | 90 |
| L16 | -0.6 | 90 |
| L17 | 2.4 | 70 |
| L18 | 1.8 | 89 |
| L19 | 4.3 | 59 |
| L20 | 13.6 | 78 |

A shift of focus due to a change in temperature of the zoom lens at the shortest zoom setting is indicated in Table XIV. In the Table XIV, $\Delta 1$ indicates a shift of focus of the prime lens measured at the shortest zoom setting, and $\Delta 2$ indicates a shift of focus of the extended lens measured at the shortest zoom setting.

TABLE XIV

| Shift of Focus of $\Delta 1$ Prim Lens System at Shortest Zoom Setting | Shift of Focus of $\Delta 2$ Extended Lens System at Shortest Zoom Setting |
|---|---|
| 0.3 $\mu$m/° C. | 5.6 $\mu$m/° C. |

As apparent from Table XIV, the extended lens shows only a small shift of focus due to a change in temperature. This is because the lens elements L15 and L16 of the extender lens group Gext according to the fourth embodiment have a temperature coefficient of refraction index of $-0.6\times10^{-6}/°$C. smaller than that of the lens elements L15 and L16 of the extender lens group Gext according to the first embodiment and, in consequence, the temperature coefficient of refraction index affects a shift of focus a little.

The zoom lens equipped with a temperature compensating feature of the invention may be midified. For example, the front extender lens sub-group may include not only one negative lens element but two negative lens element, or the rear extender lens sub-group may include not only one positive lens element but two positive lens element. In this instance, these two negative lens element and these two positive lens elements may not be necessary to be a cemented lens. Further, the number of positive single lens elements having a positive power, which is defined by the Abbe number, included in the front extender lens sub-group is not limited to one and may be three or more. The extender lens group Gext may be of a type which increases the prim-lens focal length not only by X2 but also by X3, X4 or more.

It is to be understood that the present invention may be embodied with various changes, modifications and improvements, which may occur to those skilled in the art, without departing from the spirit and scope of the invention defined in the following claims.

What is claimed is:

1. A zoom lens comprising:

movable lens groups for focusing and zooming the zoom lens;

a relay lens group disposed on the image side of said movable lens groups and comprising a front relay lens sub-group and a rear relay lens sub-group disposed at a predetermined axial separation for functioning to produce a focused image; and an extender lens group removably incorporated between said front and rear relay lens sub-groups for increasing a prime-lens focal length of the zoom lens, said extender lens group comprising:

a front extender lens sub-group having positive refracting power and including at least a negative power lens element; and a rear extender lens sub-group having negative refracting power and including at least a positive power lens element;

said extender lens group satisfying the following conditions:

$P1 < 3.0$ $$P2 > 12.0$$

where P1 is the temperature coefficient of refraction index of said negative lens element in said front extender lens sub-group and P2 is the temperature coefficient of refraction index of said positive lens element in said rear extender lens sub-group, said P1 and P2 being defined by dn/dt relative ($\times 10^{-6}$/°C.) for a wave length of e-line.

2. The zoom lens as defined in claim 1, wherein said extender lens group further satisfies the following condition:

$$v1 \geq 80$$

where v1 is the dispersion of said positive lens element in said front extender lens sub-group.

3. An extender lens group adapted to be removably incorporated between front and rear lens groups of a zoom lens for increasing a prime-lens focal length of the zoom lens, said extender lens group comprising:

a front extender lens sub-group having positive refracting power and including at least a negative power lens element; and a rear extender lens sub-group having negative refracting power and including at least a positive power lens element;

said extender lens group satisfying the following conditions:

$$P1 < 3.0$$

$$P2 > 12.0$$

where P1 is the temperature coefficient of refraction index of said negative lens element in said front extender lens sub-group, P2 is the temperature coefficient of refraction index of said positive lens element in said rear extender lens sub-group, said P1 and P2 being defined by dn/dt relative ($\times 10^{-6}$/°C.) for a wave length of e-line.

4. The extender lens group of claim 3, wherein the extender lens group satisfies the condition $v1 \geq 80$, where v1 is the dispersion of said positive lens element in said front extender lens sub-group.

* * * * *